United States Patent
Rawson et al.

(10) Patent No.: US 7,356,865 B2
(45) Date of Patent: Apr. 15, 2008

(54) APPARATUS AND METHOD FOR REMOVING CONTAMINANTS FROM DRY CLEANING SOLVENT

(75) Inventors: James Rulon Young Rawson, Clifton Park, NY (US); David Najewicz, Prospect, KY (US)

(73) Assignee: General Electric Company, Niskayuna, NY (US)

( * ) Notice: Subject to any disclaimer, the term of this patent is extended or adjusted under 35 U.S.C. 154(b) by 525 days.

(21) Appl. No.: 10/629,146

(22) Filed: Jul. 29, 2003

(65) Prior Publication Data
US 2005/0022316 A1    Feb. 3, 2005

(51) Int. Cl.
*D06B 11/00* (2006.01)
*D06B 19/00* (2006.01)
*D06B 35/00* (2006.01)

(52) U.S. Cl. ................ 8/149; 8/149.1; 8/158
(58) Field of Classification Search .......... 8/149, 8/149.1, 142, 158
See application file for complete search history.

(56) References Cited

U.S. PATENT DOCUMENTS

| | | | |
|---|---|---|---|
| 2,828,862 A | 4/1958 | Johnson |
| 3,203,208 A | 8/1965 | Brucken |
| 3,327,856 A | 6/1967 | Beduhn |
| 3,386,796 A | 6/1968 | Videen |
| 3,421,835 A | 1/1969 | McCarty |
| 3,497,452 A | 2/1970 | Arvanitakis |
| 3,583,567 A | 6/1971 | Maestrelli |
| 3,728,074 A | 4/1973 | Victor |
| 3,931,011 A | 1/1976 | Richards et al. |
| 3,966,602 A | 6/1976 | Burger |
| 4,138,337 A | 2/1979 | Smith |
| D253,422 S | 11/1979 | Smith |
| 4,279,704 A | 7/1981 | Noble, Sr. et al. |
| 4,283,279 A | 8/1981 | Smith |
| 4,288,329 A | 9/1981 | Duval |
| 4,298,465 A | 11/1981 | Druffel |
| 4,444,625 A | 4/1984 | Smith |
| 4,456,529 A | 6/1984 | Shinaver |
| 4,513,590 A | 4/1985 | Fine |

(Continued)

FOREIGN PATENT DOCUMENTS

EP    0 543 665 A1    5/1993

(Continued)

OTHER PUBLICATIONS

"Dahl Fuel Filter Water Separator," Pecuniary, Inc. (www.dieselfuels.com), 10 pages.

(Continued)

*Primary Examiner*—Michael Barr
*Assistant Examiner*—Rita R Patel
(74) *Attorney, Agent, or Firm*—Jason K. Klindtworth; Curtis B. Brueske

(57) ABSTRACT

The present invention relates to a method and apparatus for removing contaminants from a solvent based cleaning fluid. An article cleaning apparatus comprises an ultrafiltration filter having a pore size of about 0.01 microns to about 0.2 microns. A method for performing a solvent based cleaning process using an article cleaning apparatus comprises passing a solvent based cleaning fluid through an ultrafiltration filter having a having a pore size of about 0.01 microns to about 0.2 microns.

24 Claims, 3 Drawing Sheets

U.S. PATENT DOCUMENTS

| | | |
|---|---|---|
| 4,661,612 A | 4/1987 | George et al. |
| 4,712,392 A | 12/1987 | Hagiwara et al. |
| 4,774,346 A | 9/1988 | Imai et al. |
| 4,793,938 A * | 12/1988 | Dayton ................. 210/774 |
| 5,047,123 A | 9/1991 | Arvanitakis |
| 5,069,755 A | 12/1991 | Durr et al. |
| 5,219,371 A | 6/1993 | Shim et al. |
| 5,225,509 A | 7/1993 | Heinrich et al. |
| 5,236,580 A | 8/1993 | Kelleher |
| 5,238,899 A | 8/1993 | Kadowaki et al. |
| 5,245,067 A | 9/1993 | Schneider et al. |
| 5,288,831 A | 2/1994 | Ichinobe et al. |
| 5,348,588 A | 9/1994 | Winston |
| 5,520,028 A | 5/1996 | Kim et al. |
| 5,783,078 A | 7/1998 | Roll et al. |
| 5,860,796 A | 1/1999 | Clausen |
| 5,948,441 A | 9/1999 | Lenk et al. |
| 5,997,739 A | 12/1999 | Clausen et al. |
| 6,042,617 A | 3/2000 | Berndt |
| 6,042,618 A | 3/2000 | Berndt et al. |
| 6,056,789 A | 5/2000 | Berndt et al. |
| 6,059,845 A | 5/2000 | Berndt et al. |
| 6,063,135 A * | 5/2000 | Berndt et al. ................. 8/142 |
| 6,086,635 A | 7/2000 | Berndt et al. |
| 6,203,698 B1 | 3/2001 | Goodrich |
| 6,691,536 B2 * | 2/2004 | Severns et al. ............ 68/12.27 |
| 6,857,162 B1 * | 2/2005 | Rasmussen .................. 15/320 |
| 6,875,364 B2 * | 4/2005 | Gordon ..................... 210/791 |
| 7,000,437 B2 | 2/2006 | Raney et al. |
| 2003/0034305 A1 * | 2/2003 | Luehmann et al. ......... 210/646 |
| 2003/0196277 A1 | 10/2003 | Hallman et al. |
| 2004/0045096 A1 | 3/2004 | Mani et al. |
| 2004/0255394 A1 | 12/2004 | Mani et al. |
| 2005/0071929 A1 | 4/2005 | Mani et al. |

FOREIGN PATENT DOCUMENTS

EP            620309 A1 *   10/1994

OTHER PUBLICATIONS

"Turbine Series Fuel Filter/Water Separators," Mid-Atlantic Engine Supply Corp. (www.maesco.com), 11 pages.

* cited by examiner

APPARATUS AND METHOD FOR REMOVING CONTAMINANTS FROM DRY CLEANING SOLVENT

FIELD OF THE INVENTION

This invention relates to a dry cleaning apparatus. In particular, this invention relates to a method and an apparatus for removing contaminants from dry cleaning solvents.

BACKGROUND OF THE INVENTION

Dry cleaning processes include the use of various solvents with appropriate machinery to accomplish the cleaning of an article. The solvents used in dry cleaning processes solubilize grease related stains such as body oils. Examples of solvents used in dry cleaning processes include kerosene, carbon tetrachloride, trichloroethylene, perchloroethylene, and silicone based solvents.

The growth of bacteria in solvents used for dry cleaning clothes can lead to the development of odors in the articles subject to dry cleaning and eventually results in biofouling of the dry cleaning equipment. The growth of bacteria in the solvent can be accelerated by the presence of water in the solvent. The growth of bacteria in the solvent typically produces unwanted odors and results in the development of "bio-slime" on or in components in a dry cleaning apparatus.

Dry cleaning systems have used a fractional distillation process to purify dry cleaning solvents and separate water from dry cleaning solvent. The distillation process consumes additional energy and presents the challenge of devising methods and devices to capture all of the vapors generated in the distillation process.

It would, therefore, be desirable to have a dry cleaning apparatus that comprises a device to remove material that can lead to biofouling of components in the dry cleaning device and to remove material that can lead to odors in the articles subjected to dry cleaning. Further, it would be desirable to have a device that does not use a distillation process to do so.

SUMMARY OF THE INVENTION

The present invention provides an apparatus and method for cleaning articles. In one embodiment, an article cleaning apparatus 1000 comprises: an air management mechanism 1; a cleaning basket assembly 2; a fluid processing mechanism 4 comprising an ultrafiltration filter 127 having a pore size of about 0.01 microns to about 0.2 microns; and a controller 5 configured to control a cleaning process using a solvent based cleaning fluid, wherein said air management mechanism 1 is in communication with said cleaning basket assembly 2 and with said fluid processing mechanism 4; said cleaning basket assembly 2 is in communication with said fluid processing mechanism 4; and said controller 5 is in communication with said air management mechanism 1, with said cleaning basket assembly 2, and with said fluid processing mechanism 4.

In another embodiment, an article cleaning apparatus 1000 comprises: an air management mechanism 1; a cleaning basket assembly 2; a fluid processing mechanism 4 comprising a working fluid device 6, a fluid regeneration device 7, and a clean fluid device 8; and a controller 5 configured to control a cleaning process using a solvent based cleaning fluid or a water based cleaning fluid, wherein said air management mechanism 1 is in communication with said cleaning basket assembly 2, with said working fluid device 6, and with said clean fluid device 6; said cleaning basket assembly 2 is in communication with said working fluid device 6, and with said clean fluid device 8; and said controller 5 is in communication with said air management mechanism 1, with said cleaning basket assembly 2, with said working fluid device 6, with said fluid regeneration device 7, and with said clean fluid device 8, and wherein said fluid regeneration device 7 comprises an ultrafiltration filter 127 having a pore size of about 0.01 microns to about 0.2 microns.

In another embodiment, a method for performing a solvent based cleaning process using an article cleaning apparatus 1000 comprises: passing a solvent based cleaning fluid through an ultrafiltration filter having a pore size of about 0.01 microns to about 0.2 microns.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Dry cleaning processes include the use of various solvents with appropriate machinery to accomplish the cleaning of an article. The solvents used in dry cleaning processes solubilize grease related stains such as body oils. Examples of solvents used in dry cleaning processes include kerosene, carbon tetrachloride, trichloroethylene, perchloroethylene, and silicone based solvents.

The growth of bacteria in solvents used for dry cleaning of clothes can lead to the development of odors in the articles subject to dry cleaning and eventually results in biofouling of the dry cleaning equipment. The growth of bacteria in the solvent can be accelerated by the presence of water in the solvent. The growth of bacteria in the solvent can also result in the development of "bio-slime" on or in components in a dry cleaning apparatus.

Bacteria, viruses, and other particulate material may be removed from the dry cleaning solvent by filtration through an ultrafiltration filter. This material may be retained by the ultrafiltration filter while the dry cleaning solvent passes through.

The present invention provides an article cleaning apparatus and a method for cleaning articles. As used herein, the term, "articles" is defined, for illustrative purposes and without limitation, as fabrics, textiles, garments, and linens and any combination thereof. As used herein, the term, "solvent based cleaning fluid" is defined for illustrative purposes and without limitation, as comprising a cyclic siloxane solvent and, optionally, a cleaning agent. As used herein, the term, "cleaning agent" is defined for illustrative purposes and without limitation, as being selected from the group consisting of sanitizing agents, emulsifiers, surfactants, detergents, bleaches, softeners, and combinations thereof. As used herein, the term, "water based cleaning fluid" is defined for illustrative purposes and without limitation, as comprising water and, optionally, a cleaning agent.

Figure 1:
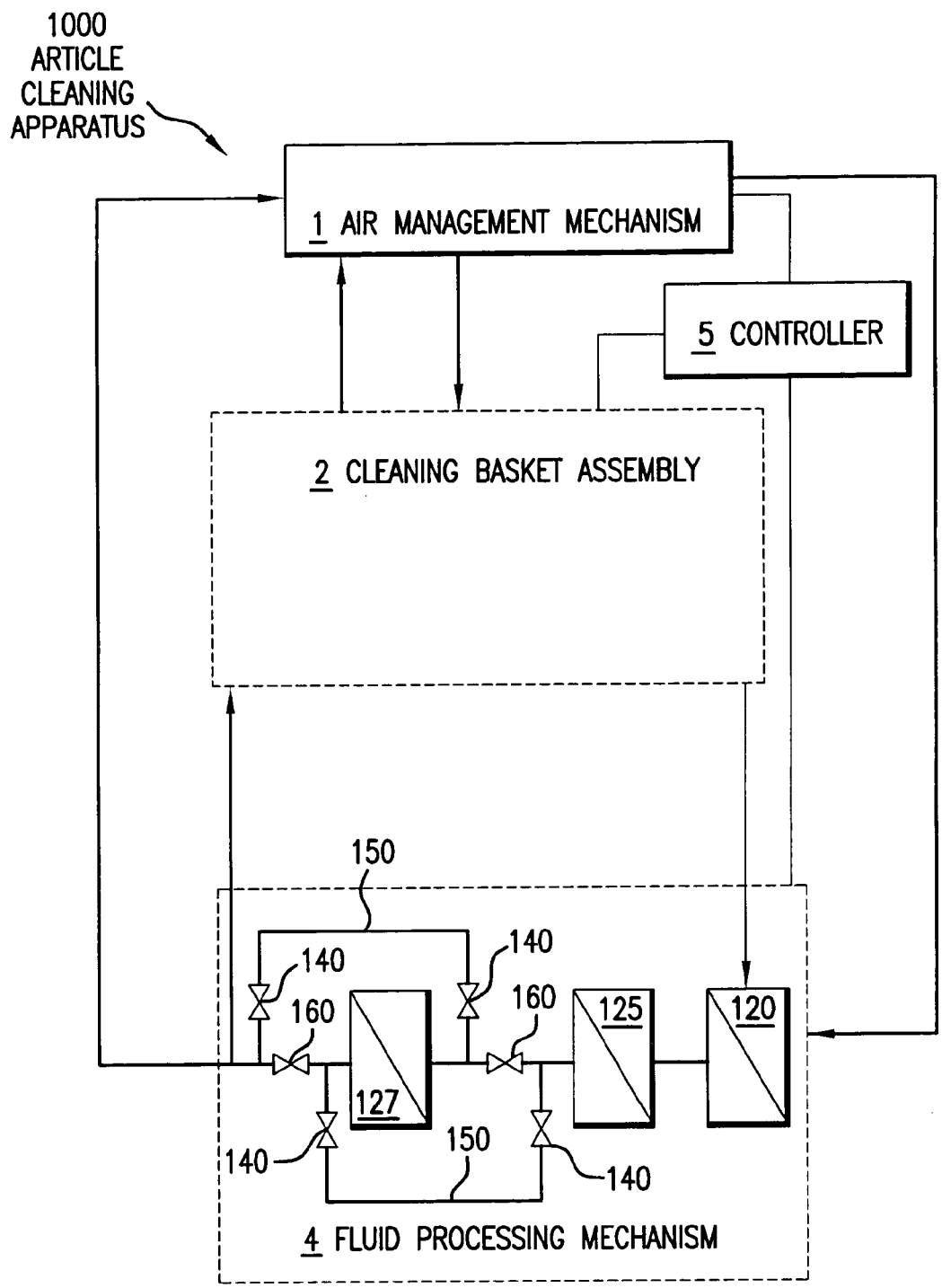
FIG. 1 is a block diagram of the article cleaning apparatus 1000 in accordance with one embodiment of the present invention.

In the present invention, the article cleaning apparatus 1000 of FIG. 1 can be configured to perform a cleaning process using a solvent cleaning process or to perform a combination of a solvent cleaning process and a water cleaning process. It is recognized that alternative configurations of the article cleaning apparatus 1000 are possible.

Referring now to FIG. 1, the article cleaning apparatus 1000 is operable to perform a solvent based cleaning process. The article cleaning apparatus comprises an air management mechanism 1, a cleaning basket assembly 2, a fluid processing mechanism 4, and a controller 5, wherein the fluid processing mechanism 4 comprises an ultrafiltration filter 127. Each of the air management mechanism 1, the cleaning basket assembly 2, the fluid processing mechanism 4, and the controller 5 are in communication with each other. The air management mechanism 1 provides air intake and air exhaust for the cleaning basket assembly 2 and the fluid processing mechanism 4. The cleaning basket assembly 2 provides a mechanism to clean clothing articles with a solvent based cleaning fluid. The fluid processing mechanism 4 provides a solvent based cleaning fluid to the cleaning basket assembly 2. Once the cleaning process is complete or during the cleaning process, the cleaning fluid may flow to fluid processing mechanism 4 wherein the cleaning fluid passes through an ultrafiltration filter 127. The controller 5 is configured to perform a cleaning process.

The ultrafiltration filter 127 comprises materials compatible with the solvent based cleaning fluid used in the article cleaning apparatus 1000 and method of cleaning and has a pore size range of about 0.01 microns to about 0.2 microns. Examples of materials compatible with a siloxane solvents include, but are not limited to, polyphenylenesulfide, polysulfone, polyamide, silicones, and highly cross linked polyamides or fluoroplymers.

In an embodiment, the ultrafiltration filter 127 is operable to only allow materials having a molecular weight of less than 100,000 daltons to pass through. In another embodiment, the ultrafiltration filter 127 comprises an ultrafiltration membrane. In another embodiment, the ultrafiltration filter 127 comprises an ultrafiltration membrane in a spiral wound configuration or as hollow fiber filters.

In another embodiment, the fluid processing mechanism comprises an ultrafiltration filter 127 and a flushing device. In an embodiment, the flushing device is operable to reverse the flow of solvent based cleaning fluid through the ultrafiltration filter 127. In another embodiment, the flushing device comprises flushing valves 140 and flushing lines 150 whereby the flow of solvent based cleaning fluid through the ultrafiltration filter 127 can be reversed by closing line valves 160 and opening flushing valves 140. It is recognized that alternate configurations of a flushing device are possible.

In another embodiment, the fluid processing mechanism 4 further comprises a particulate filter 125 in communication with said cleaning basket assembly 2 and said ultrafiltration filter 127. In an embodiment, the particulate filter 125 has a mesh size in a range from about 0.5 microns to about 50 microns. In another embodiment, the particulate filter 125 is a cartridge filter fabricated from materials selected from the group consisting of thermoplastics, polyethylene, polypropylene, polyester, aluminum, stainless steel, metallic mesh, sintered metal, ceramic, diatomaceous earth, and any combination thereof.

In another embodiment, the fluid processing mechanism 4 further comprises a mechanical filter 120 in communication with said cleaning basket assembly 2 and said ultrafiltration filter 127. In an embodiment, the mechanical filter 120 has a mesh size in a range from about 50 microns to about 1000 microns.

In another embodiment, the fluid processing mechanism 4 comprises an ultrafiltration filter 127, a particulate filter 125, and a mechanical filter 120. The mechanical filter 120 is operationally located between the cleaning basket assembly 2 and the particulate filter 125, and the particulate filter 125 is operationally located between the mechanical filter 120 and the ultrafiltration filter 127. In an embodiment, the particulate filter 125 has a mesh size in a range from about 0.5 microns to about 50 microns. In another embodiment, the mechanical filter 120 has a mesh size in a range from about 50 microns to about 1000 microns.

Figure 2:
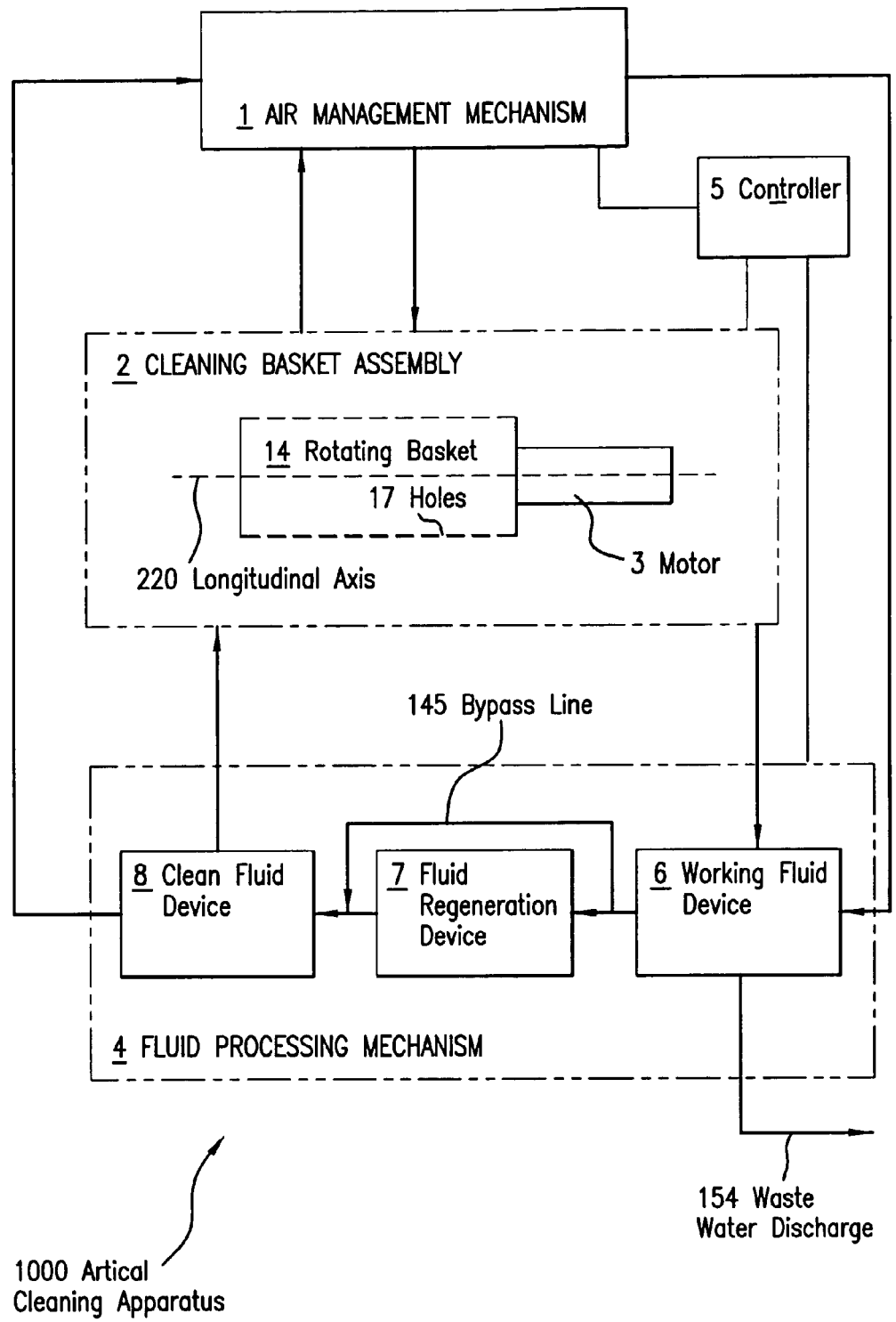
FIG. 2 is a block diagram of the article cleaning apparatus 1000 in accordance with one embodiment of the present invention.

Referring now to FIG. 2, in an embodiment of present invention, the article cleaning apparatus 1000 is operable to perform a solvent based cleaning process and a water based cleaning process. In FIG. 2, the cleaning basket assembly 2 typically comprises a rotating basket 14 coupled to a motor 3. The rotating basket 14 comprises a plurality of holes 17. The motor 3 rotates the rotating basket 14. Suitable drive system alternatives, presented for illustration and without limitation include, direct drive, pulley-belt drive, transmissions, and any combination thereof. The direct drive orientation of the rotating basket 14 and the motor 3 is provided for illustrative purposes and it is not intended to imply a restriction to the present invention. In one embodiment of the present invention (not shown in FIG. 2), the motor 3 has a different major longitudinal axis than the longitudinal axis 220 of the rotating basket 14, and the motor 3 is coupled to the rotating basket 14 by a pulley and a belt.

The fluid processing mechanism 4 comprises a working fluid device 6, a fluid regeneration device 7, and a clean fluid device 8. The working fluid device 6 is in communication with the air management mechanism 1,the cleaning basket assembly 2, the fluid regeneration device 7, and the clean fluid device 8. The fluid regeneration device 7 is in communication with the working fluid device 6 and the clean fluid device 8. Further, the fluid regeneration device 7 comprises an ultrafiltration device. The clean fluid device 8 is in communication with the working fluid device 6, the fluid regeneration device 7, the cleaning basket assembly 2, and the air management mechanism 1. Further, the working fluid device 6, fluid regeneration device 7, and clean fluid device 8 are each in communication with the controller 5. The controller 5 is configured to control a cleaning process using a solvent based cleaning fluid and water based cleaning fluid.

The working fluid device 6 is operable to receive a water based cleaning fluid or a solvent based cleaning fluid from the cleaning basket assembly 2 and either discharge a water based cleaning fluid through the waste water discharge piping 154, pass a solvent based cleaning fluid to the fluid regeneration device 7, or pass a solvent based cleaning fluid directly to the clean fluid device 8 via the bypass line 145.

The clean fluid device 8 comprises a reservoir operable to store a solvent based cleaning fluid. The clean fluid device 8 is also operable to provide a solvent based cleaning fluid to the cleaning basket assembly 2.

The fluid regeneration device 7 comprises an ultrafiltration filter as previously described. The ultrafiltration filter comprises materials compatible with the solvent based cleaning fluid used in the article cleaning apparatus 1000 and method of cleaning and has a pore size range of about 0.01 microns to about 0.2 microns. In an embodiment, the ultrafiltration filter is operable to only allow materials having a molecular weight of less than 100,000 daltons to pass through. In another embodiment, the ultrafiltration filter comprises an ultrafiltration membrane. In another embodiment, the ultrafiltration filter comprises an ultrafiltration membrane In a spiral wound configuration or as hollow fiber filters.

In an embodiment where the ultrafiltration filter comprises an ultrafiltration membrane, the fluid regeneration device 7 device further comprises a flushing device in communication with the ultrafiltration membrane, wherein the flushing device is operable to reverse theto flow of solvent based cleaning fluid through the ultrafiltration filter.

Figure 3:
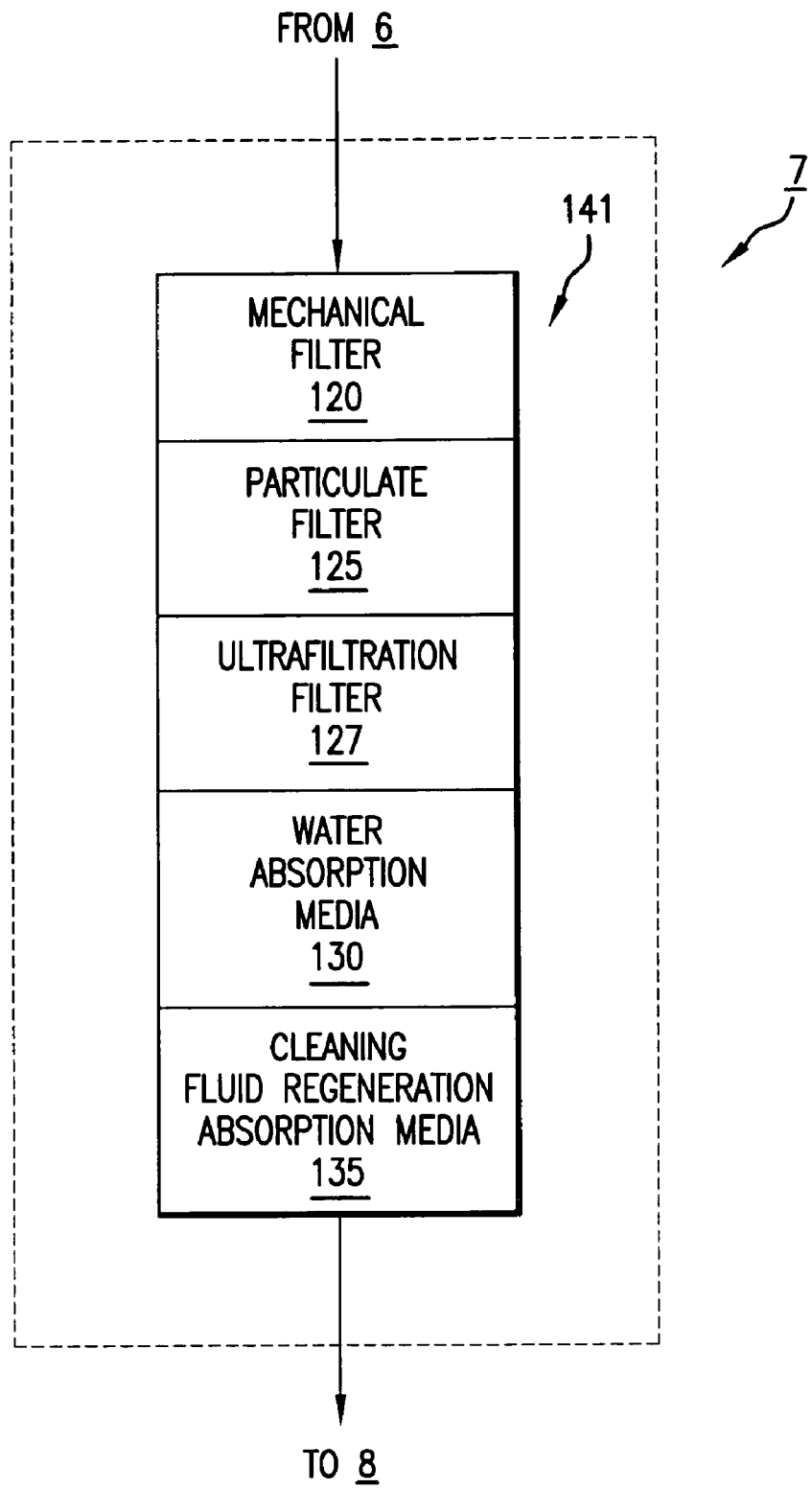
FIG. 3 is a schematic diagram of a filter arrangement in accordance with one embodiment of the present invention.

Referring now to FIG. 3, in an embodiment the fluid regeneration device 7 comprises a regeneration cartridge 141 comprising an ultrafiltration filter 127. The inlet side of the regeneration cartridge 141 is in communication with the working fluid device 6. The regeneration cartridge 141 further comprises at least a water adsorption media 130 in communication with a cleaning fluid regeneration adsorption media 135. In another embodiment, the regeneration cartridge 141 further comprises a mechanical filter 120 and a particulate filter 125.

In one embodiment of the regeneration cartridge 141, a solvent based cleaning fluid flowing from the cleaning basket assembly 2 passes sequentially through the mechanical filter 120, particulate filter 125, ultrafiltration filter 127, water adsorption media 130, and cleaning fluid regeneration adsorption media 135. The cleaning fluid regeneration adsorption media 135 contains a portion of the solvent based cleaning fluid in order to replenish the solvent based cleaning tiuld that is consumed during an article cleaning process. The cleaning fluid regeneration adsorption media 135 also contains a replacement amount of solvent based cleaning fluid which is disposed of when changing out the regeneration cartridge 141.

In another embodiment of the regeneration cartridge 141, the materials to fabricate the cleaning fluid regeneration adsorption media 135 are selected from the group consisting of activated charcoal, carbon, calcined clay, Kaolinite, adsorption resins, carbonaceous type resins, silica gels, alumina in acid form, alumina in base form, alumina in neutral form, zeolites, molecular sieves, and any combination thereof. Both the amount of solvent based cleaning fluid regeneration and the speed of solvent based cleaning fluid regeneration depend on the volume of the cleaning fluid regeneration adsorption media 135.

In one embodiment, the mechanical filter 120 has a mesh size in a range from about 50 microns to about 1000 microns. In another embodiment of the present invention, the particulate filter 125 has a mesh size in a range from about 0.5 microns to about 50 microns.

In one embodiment, the particulate filter 125 is a cartridge filter fabricated from materials selected from the group consisting of thermoplastics, polyethylene, polypropylene, polyester, aluminum, stainless steel, metallic mesh, sintered metal, ceramic, diatomaceous earth, and any combination thereof.

The storage tank in the clean fluid device 8 stores the solvent based cleaning fluid received from the fluid regeneration device 7. The clean fluid device 8 further comprises a pump in communication with the storage tank. The pump is in communication with the cleaning basket assembly 2.

While various embodiments have been described in detail and by way of illustration, it will be understood that various modifications and substitutions may be made in the described embodiments without departing from the spirit and scope of the invention as defined by the appended claims.

We claim:

1. An article cleaning apparatus for cleaning articles using a solvent based cleaning fluid and for cleaning the solvent based cleaning fluid without using distillation, the apparatus comprising:
   an air management mechanism;
   a cleaning basket assembly;
   a fluid processing mechanism comprising an ultrafiltration filter configured to remove bacteria from solvent based cleaning fluid by having a pore size of about 0.01 microns to about 0.2 microns; and
   a controller configured to clean the articles in the cleaning basket assembly using the solvent based cleaning fluid and to clean the solvent based cleaning fluid using the ultrafiltration filter to remove the bacteria from the solvent based cleaning fluid without using distillation on the solvent based cleaning fluid,
   wherein
   each of said air management mechanism, said cleaning basket assembly and said fluid processing mechanism is in dedicated communication with each remaining one of said air management mechanism, said cleaning basket assembly and said fluid processing mechanism; and
   said controller is in communication with said air management mechanism, with said cleaning basket assembly, and with said fluid processing mechanism.

2. The apparatus of claim 1, wherein said fluid processing mechanism further comprises a flushing device operable to reverse the flow of the solvent based cleaning fluid through said ultrafiltration filter.

3. The apparatus of claim 1, wherein said ultrafiltration filter is operable to only allow materials having a molecular weight of less than about 100,000 daltons to pass through.

4. The apparatus of claim 1, wherein said ultrafiltration filter comprises an ultrafiltration membrane.

5. The apparatus of claim 4, wherein said ultrafiltration membrane is in a spiral wound configuration.

6. The apparatus of claim 1, wherein the solvent based cleaning fluid comprises a siloxane.

7. The apparatus of claim 1, wherein said fluid processing mechanism further comprises a particulate filter in communication with said cleaning basket assembly and said ultrafiltration filter.

8. The apparatus of claim 7, wherein said particulate filter has a mesh size in a range from about 0.5 microns to about 50 microns.

9. The apparatus of claim 1, wherein said fluid processing mechanism further comprises a mechanical filter in communication with said cleaning basket assembly and said ultrafiltration filter.

10. The apparatus of claim 9, wherein said mechanical filter has a mesh size in a range from about 50 microns to about 1000 microns.

11. An article cleaning apparatus for cleaning articles using a solvent based cleaning fluid or a water based cleaning fluid and for cleaning the solvent based cleaning fluid without using distillation, the apparatus comprising:
   an air management mechanism;
   a cleaning basket assembly;
   a fluid processing mechanism comprising a working fluid device, a fluid regeneration device, and a clean fluid device, wherein said fluid regeneration device comprises an ultrafiltration filter configured to remove bacteria from solvent based cleaning fluid by having a pore size of about 0.01 microns to about 0.2 microns; and a controller configured to clean the articles in the cleaning basket assembly using the solvent based cleaning fluid or the water based cleaning fluid and to clean the solvent based cleaning fluid using the ultrafiltration filter to remove the bacteria from the solvent based cleaning fluid without using distillation on the solvent based cleaning fluid, wherein each of said air management mechanism, said cleaning basket assembly and said fluid Processing mechanism is in dedicated communication with each remaining one of said air management mechanism, said cleaning basket assembly and said fluid Processing mechanism and said controller is in communication with said air management mechanism, with said cleaning basket assembly, with said working fluid device, with said fluid regeneration device, and with said clean fluid device.

12. The apparatus of claim 11, wherein said fluid regeneration device further comprises a flushing device wherein said flushing device is operable to reverse the flow of the solvent based cleaning fluid through said ultrafiltration filter.

13. The apparatus of claim 11, wherein said ultrafiltration filter is operable to only allow about materials having a molecular weight of less than about 100,000 daltons to pass through.

14. The apparatus of claim 11, wherein said ultrafiltration filter comprises an ultrafiltration membrane.

15. The apparatus of claim 14, wherein said ultrafiltration membrane is in a spiral wound configuration.

16. The apparatus of claim 11, wherein the solvent based cleaning fluid comprises a siloxane.

17. The apparatus of claim 11, wherein said fluid regeneration device further comprises a particulate filter in communication with said cleaning basket assembly and said ultrafiltration filter.

18. The apparatus of claim 14, wherein said particulate filter has a mesh size in a range from about 0.5 microns to about 50 microns.

19. The apparatus of claim 14, wherein said particulate filter is a cartridge filter fabricated from materials selected from the group consisting of thermoplastics, polyethylene, polypropylene, polyester, aluminum, stainless steel, metallic mesh, sintered metal, ceramic, diatomaceous earth, and any combination thereof.

20. The apparatus of claim 11, wherein said fluid regeneration device further comprises a mechanical filter in communication with said cleaning basket assembly and said ultrafiltration filter.

21. The apparatus of claim 20, wherein said mechanical filter has a mesh size in a range from about 50 microns to about 1000 microns.

22. The apparatus of claim 11, wherein the fluid regeneration device comprises a regeneration cartridge comprising said ultrafiltration filter.

23. The apparatus of claim 22, wherein said regeneration cartridge comprises a mechanical filter, wherein said mechanical filter has a mesh size in a range from about 50 microns to about 1000 microns.

24. The apparatus of claim 22, wherein said regeneration cartridge comprises a particulate filter, wherein said particulate filter has a mesh size in a range from about 0.5 microns to about 50 microns.

* * * * *

UNITED STATES PATENT AND TRADEMARK OFFICE
CERTIFICATE OF CORRECTION

| | | |
|---|---|---|
| PATENT NO. | : 7,356,865 B2 | Page 1 of 1 |
| APPLICATION NO. | : 10/629146 | |
| DATED | : April 15, 2008 | |
| INVENTOR(S) | : James Rulon Young Rawson et al. | |

It is certified that error appears in the above-identified patent and that said Letters Patent is hereby corrected as shown below:

In Column 2, Line 1, after "fluid device" delete "6;" and insert -- 8; --, therefor.

In Column 4, Line 38, delete "1,the" and insert -- 1, the --, therefor.

In Column 5, Line 33, delete "tiuld" and insert -- fluid --, therefor.

In Column 8, Line 5, in Claim 18, delete "14," and insert -- 17, --, therefor.

In Column 8, Line 9, in Claim 19, delete "14," and insert -- 17, --, therefor.

Signed and Sealed this

Twenty-fifth Day of November, 2008

JON W. DUDAS
*Director of the United States Patent and Trademark Office*